Figure 1:
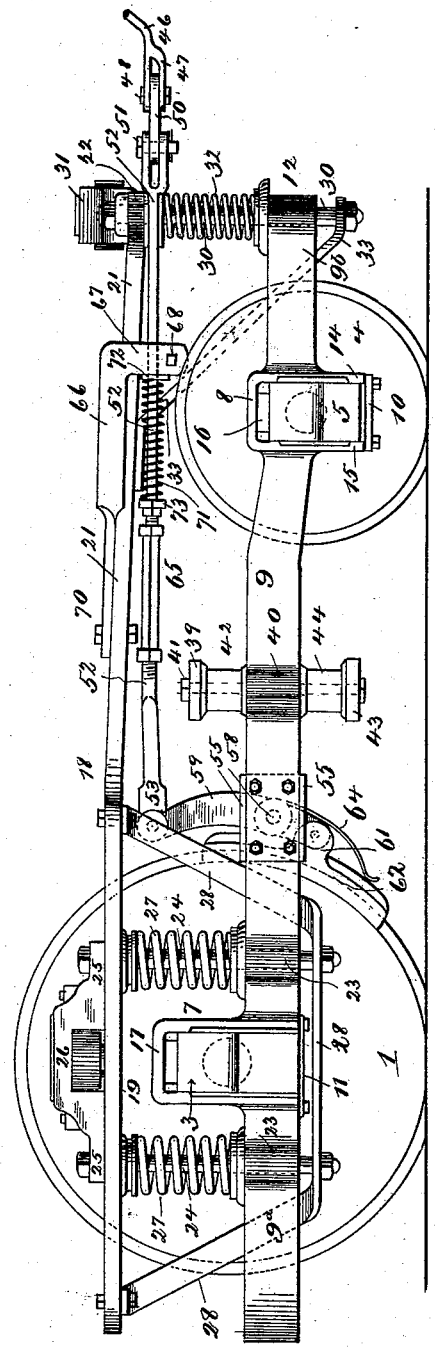

(No Model.) 5 Sheets—Sheet 1.

J. A. BRILL.
MOTOR TRUCK.

No. 507,207. Patented Oct. 24, 1893.

Attest:
C. W. Benjamin
H. F. Dunbar

Inventor
John A. Brill
by Joseph L. Levy
Attorney.

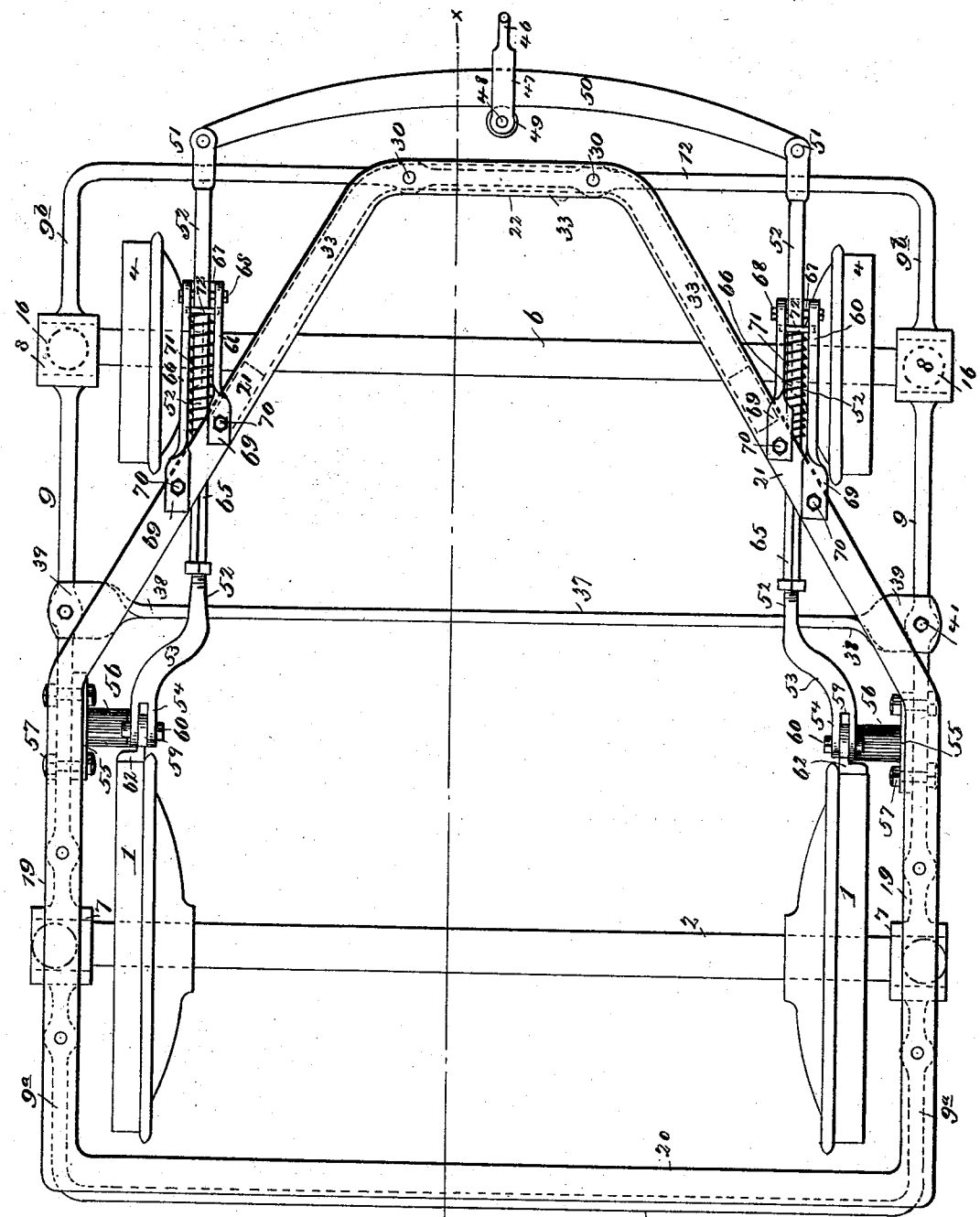

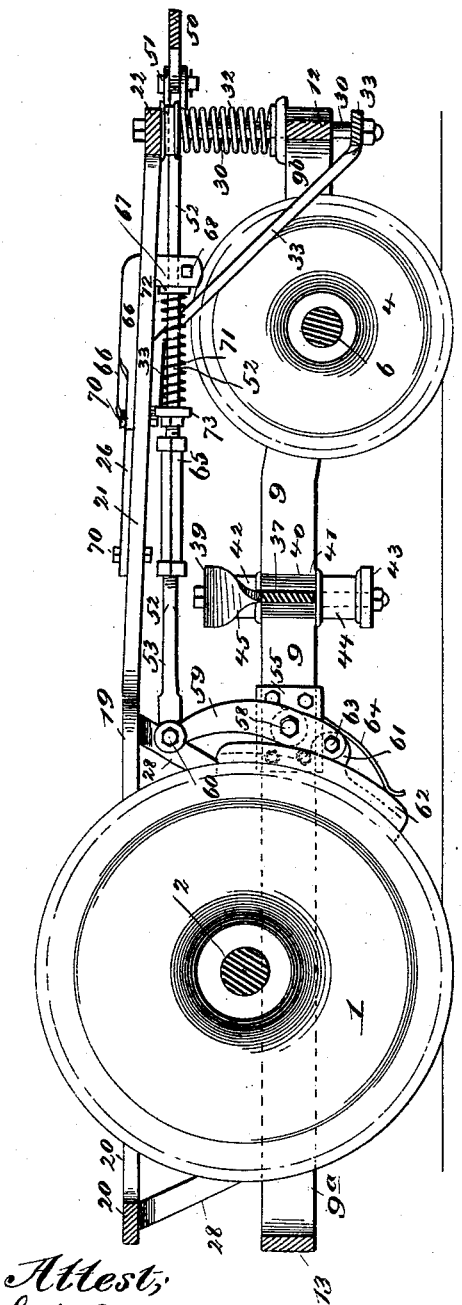

(No Model.)

J. A. BRILL.
MOTOR TRUCK.

No. 507,207.

5 Sheets—Sheet 4.

Patented Oct. 24, 1893.

Attest:
C. N. Benjamin
H. G. Dunbar

Inventor,
John A. Brill
by Joseph L. Levy
atty.

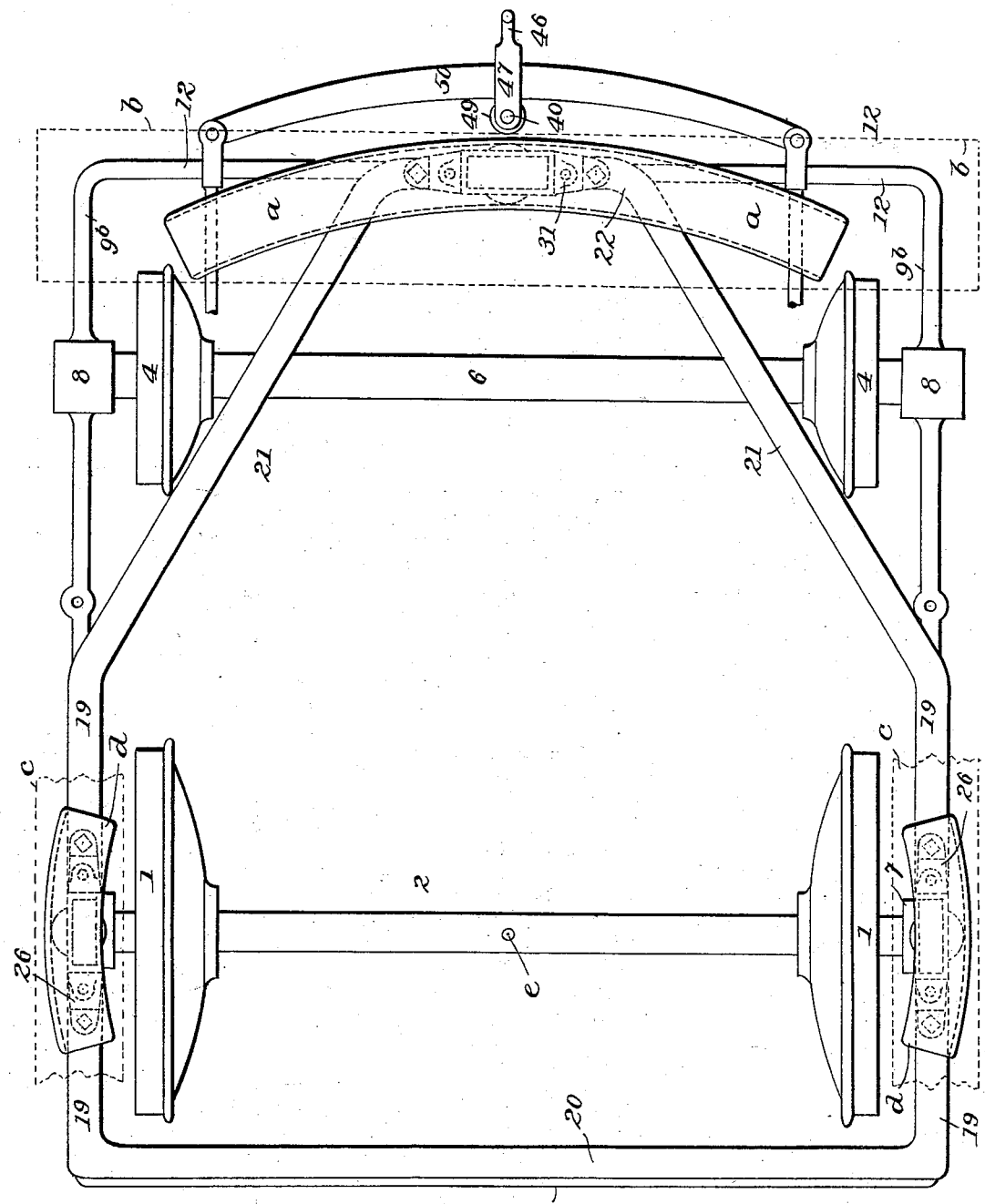

UNITED STATES PATENT OFFICE.

JOHN A. BRILL, OF PHILADELPHIA, PENNSYLVANIA.

MOTOR-TRUCK.

SPECIFICATION forming part of Letters Patent No. 507,207, dated October 24, 1893.

Application filed October 22, 1892. Serial No. 449,607. (No model.)

*To all whom it may concern:*

Be it known that I, JOHN A. BRILL, a citizen of the United States of America, residing at Philadelphia, county of Philadelphia, State of Pennsylvania, have invented certain new and useful Improvements in Motor-Trucks, of which the following is a specification.

My invention relates to improvements in pivotal trucks, more especially designed for carrying an electric motor, or for other form of self locomotion, and the special use to which it is intended to put the truck is under a car having two trucks, one at each end thereof, the special feature of such class of trucks being that there are large and small wheels, the pivotal center being located approximately over the axle of the larger wheels, for the purpose of increasing the traction of the truck.

My present structure relates in part to improvements on the truck shown and described in an application filed by me on March 1, 1892, Serial No. 423,343, in which it was desired to so construct the truck that it should be free from contact with the side steps of cars during the radiation of the truck, and also wherein the general location of parts was had with the object of increasing the traction thereof; and the present structure further embodies certain features of a structure for which myself and one Walter S. Adams filed an application on July 28, 1892, Serial No. 441,934, in which one of the objects was to provide a truck with a clear open space between the truck frame wherein the motor can be placed for the purpose of increasing the facility in handling the same; also means for causing one portion of the structure to more completely keep its place upon the track, or prevent climbing; and to provide new devices for the purpose of pivotally uniting the car body and truck.

One important feature of the present structure is that it is adapted for use under both open and closed cars. It is usual in summer cars (or cars having open sides) to provide the same with steps projecting downwardly along the side of the car; and by reason of the increase of radiation of one end of this class of truck, by reason of its being pivoted away from the center, it very often struck the steps, and in many cases sufficient clearance could not be had for the steps from the field of radiation of the truck by reason of the narrowness of streets, which required the tracks to be placed close together, thus requiring narrower car bodies. In the present structure the upper chord, which composes the main element of the truck frame proper, is arranged to go inside or lie within the wheels at one end of the truck and outside the wheels at the other end of the truck; while the axle box frame, (which holds the running gear, and upon which the car supporting springs may or not lie) is preserved in substantially a rectangular form and extends outside the wheels, so that the maximum bracing and bearing surface for the car body can be preserved. By this form of structure the car steps can be cleared while the truck is strong enough to be used under cars of the closed or winter class. An axle box frame extending within the wheels necessitates the use of inside bearings or axle boxes, which are usually made in two parts, and are apt to leak and produce "hot boxes;" the brasses wear with greater rapidity, and the danger of breaking is increased. With the axle box frame extending outside of the wheels (especially at the small or trailing wheel end) the usual boxes on the ends of the axles can be used, thus avoiding these disadvantages, and giving greater facility in getting at the journals for oiling &c., while the advantages resulting from a reduction of the diameter of the upper chord at the end subjected to the greatest radiation of movement in relation to the car remain unimpaired.

Instead of placing car supporting springs adjacent to the axle boxes on the trailing end of the truck (opposite to that about which the pivotal center of the truck is located) I use one set of springs and locate them between the axle box frame and the upper chord at the end of the truck opposing the pivotal center. This does away with separate pedestals and spring posts for both sides of the running gear at one end of the truck, and enables me to use but one set of springs. This change also possesses another certain advantage, of which I will speak farther on.

Another feature of the present structure lies in flexibly supporting one end of the upper chord of the truck upon which the end rub plate is located. The springs brace this end of the upper chord against the weight or strain placed upon it, and the location of the springs upon the end of the axle box frame, which extends out beyond the axle boxes, tends to hold the trailing end of the truck down to the track, preventing it from jumping or climbing. This is effected by the pressure of the leverage brought to bear upon the wheels due to such location of the springs upon the extension of the axle box frame. Through this arrangement the greater portion of the weight of the supported car body can be preponderated upon the large or driving wheels, using comparatively heavy springs to support that end, and lighter springs to support the trailing end which receives the minimum of the preponderated weight, the pressure brought to bear upon the extended end of the axle box frame at the trailing end of the car body being transferred to the wheels at that end of the truck, acting to counterbalance the lifting tendency of the driving end.

To take the place of the springs, so far as the feature of leverage is concerned, a weight may be used which may be suitably located upon the rear or trailing end of the truck, in which case either the end rub plate or the end springs, or both, may be dispensed with.

Were it desired to retain the end spring or springs when used in combination with a weight as set forth, the spring can be of much lighter carrying capacity than ordinarily used, and the weight be correspondingly lighter than it would of necessity be were no end springs used; and if a sufficiently large weight is used the end springs can be dispensed with.

In connection with this invention I have also provided brake mechanism, shown herein, for keeping the line of draft or pull of the brake rods leading from the car platform constant. This however I do not claim herein, the same forming the subject matter of a patent granted to me, dated the 15th day of August, 1893, No. 503,121.

My invention further resides in the specific structure of the parts herein shown and described, and further pointed out in the claims.

Figure 5:
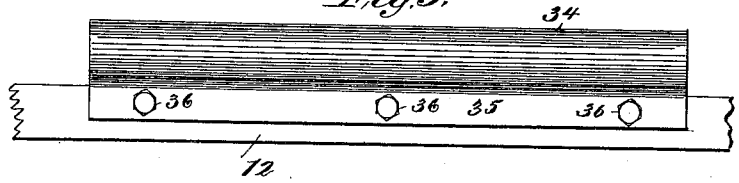
Figure 6:
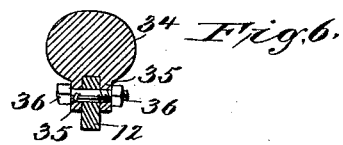
Figure 7:
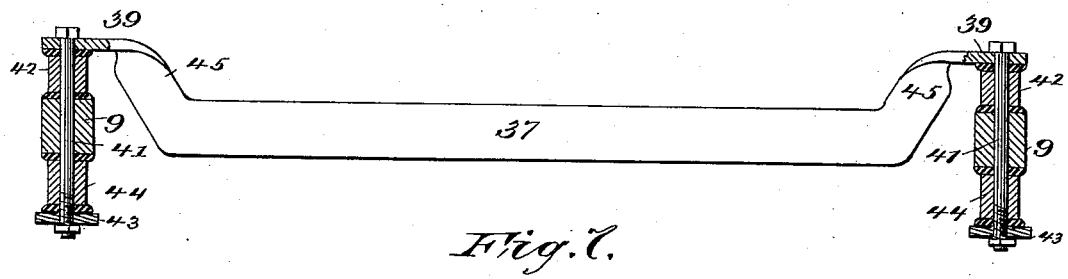

In the drawings, Figure 1 is a side elevation of my improved truck; Fig. 2, a plan view of the same. Fig. 3 is a rear end elevation, the parallel brake rods being cut away. Fig. 4 is an elevation of one side of the truck, the truck and axle box frames being partly in section taken on the line $xx$, Fig. 2. Fig. 5 is an enlarged end elevation showing the extended end of the axle box frame and a weight supported thereon; and Fig. 6, a sectional elevation of the same taken on the line $yy$, Fig. 5. Fig. 7 is a side elevation of the motor support, partly in section. Fig. 8 is a plan view of the truck, showing the means of pivotally securing the car to the truck.

Same numerals of reference refer to like parts throughout the several views.

The truck comprises the large or driving wheels 1 (to which a motor for propelling the truck is or may be sleeved or geared); 2 the axles thereof, and 3 the axle boxes for the axle, which axle boxes may be of any usual or preferred construction. The rear or trailing end of the truck is provided with wheels 4 smaller in diameter than the driving wheels, and for such trailing wheels axle boxes 5 and the axle 6 are provided. The axle boxes are secured in any suitable way within saddles 7, 8 formed integral with the axle box frame 9, and cross bars 10, 11 are bolted to the lips of the saddles to strengthen them. In this case the axle box frame shown is the spring supporting element of the truck, but for this particular function any other axle box frame of suitable construction can be used without changing the general structure of the truck or its operation.

By reference to Fig. 2 it will be seen that the axle box frame comprises the side sections 9, and the end sections 12, 13, the end sections being made homogeneous with the side sections, which produce a frame, made in one piece, so that in its construction all bolts, rivets, &c., are dispensed with, the frame being then a concrete thing, homogeneous throughout.

The broad idea of an axle box frame embodying the characteristics just set forth is shown and described in an application filed by me on the 22d day of July, 1892, Serial No. 440,879, but the special construction of this frame is not shown therein.

One of the objects sought for in the present structure is to get a clear unobstructed space between the axles, leaving the location of the transverse motor supports, &c., a matter to be accomplished without hindrance from the truck frame. To this end I have united the longitudinal members of the axle box frame by means of the end sections 12, 13, all being homogeneously united together, the frame thus completed being substantially of rectangular form throughout, which I consider best for supporting the car and controlling the axles and running gear. In order to accommodate this frame to axle boxes of varying heights (due to the use of large and small wheels) it has been usual to bend that section of the axle box frame adjacent to the small wheels downward to meet the axle boxes, the saddles encompassing the axle boxes then lying above the axle box frame.

In order to obviate the necessity of giving too great a bend to the side bars of the axle box frame at the trailing end of the truck, I dispose the operative surface of the saddles below or partially below and partially above the side bars of the axle box frame, so that the lips 14 of the saddles 8 will extend below the axle box frame, and a suitable housing or guide for the axle boxes will thus be provided, the axle box lying partially below the side bars, the whole resulting in very little distortion of the axle box frame. Elastic cushions 16, 17 are placed between the tops of all the saddles and the axle boxes.

The truck frame consists of the upper chord 18 which is of rectangular outline where it is superposed above the wheels of larger diameter, the other section being in the shape of a truncated pyramid, which causes that section when placed in position, to lie within the wheels of smaller diameter, the entire upper chord being continuous and in one piece. The rectangular section comprises the longitudinals 19 joined transversely by the end bar 20, the other end comprising the oblique sections 21 united by the transverse section 22. It is not necessary that the sections 20, 21 be disposed in a straight line, the only material feature being that the sections 21, which form a continuation of the sections 19, pass within the wheels, or if the upper chord is high enough above the wheels, as in the present case, the deflection of the sections 21 should be sufficient to clear the steps of the car during the radiation of the truck. The upper chord is spring supported and braced as follows: The axle box frame is provided with enlargements 23 in the side bars of the axle frame, such as shown in my application, Serial No. 441,984, above referred to, through which pass spring posts 24 which extend downwardly through and below the side bars and upwardly through the upper chord, and can there be secured in any usual or preferred manner; or they can pass up through the ears 25 of a side bearing 26, such as is shown and described in the application, Serial No. 441,984, before mentioned, so as to secure said side bearing to the upper chord. Car springs 27 are placed between the upper chord and side bars of the axle box frame in the usual manner, surrounding the spring posts or otherwise, and above and below the car springs could be placed spring cushions or risers in the usual way. The upper chord and spring posts at this end of the truck are braced together by the continuous strap brace 28, through which the spring posts pass, being held there by suitable nuts, which brace passes diagonally upward within the side bars to the upper chord where its ends are bent flat, by means of which the brace is secured to the upper chord by suitable bolts or nuts. Instead of a continuous strap brace being used one composed of several pieces may be used, but I prefer the former. The reduced end of the upper chord is supported upon the axle box frame as follows: The axle box frame has its side bars or longitudinal members extended past the axle boxes, as shown at $9^a$, $9^b$, the ends of these extensions being united by the cross bars 12 and 13, so that the axle box frame encircles the wheels, as before described. The springs for supporting the upper chord, instead of surrounding the axle box at this end, or being located adjacent thereto, rest upon the transverse end bar 12 of the axle box frame. This is provided with enlargements 29 which surround an aperture therein, through which pass the spring posts 30 which extend below said cross bar up to and through the end section 22 of the upper chord and by means of nuts thereon securing the end bearing 31 in the same manner as before described as regards that part of the truck about the large wheels. About the spring posts 30 are springs 32 which abut against the upper chord and the cross bar 12 of the axle box frame by means of cushions, risers, &c., in the usual way.

The car and truck are pivotally united substantially in the same manner as disclosed in the Brill and Adams application, Serial No. 441,984, filed August 2, 1892, to which cross reference is made, in which the segmental channel beam $a$ is secured to one of the cross sills $b$ of the car (shown in dotted lines Fig. 8) the depending sides of the channel $b$ engaging the roller in the end beam 31, the top plate of the beam resting on the friction plate of the bearing, thus constituting the drawing device, or in other words, pivotally uniting the car and truck for propulsion. To keep the truck or car in place in relation one to the other, and to secure a swiveling action without the use of a central king bolt and bolster, or analogous device, I secure to the side sills $c$ of the car (dotted lines, Fig. 8) the segmental angle irons, $d$, the depending sides of which engage the roller in the side bearing 26, the top plate of the angle iron resting on the friction plate of the bearing.

The foregoing secures a pivotal connection of the car and truck for drawing and swiveling purposes, the drawing device being located at one side only of the pivotal center, the side bearings and car rub plates (the angle irons $c$) being in line with and at both sides of the pivotal center, all of said devices having their curves generated from a point (as at $e$, Fig. 8) over the axle of the driving wheels, but to this location of the pivotal center, I do not limit myself in this case.

By reference to Fig. 1 it will be seen that the springs 32 are practically of the same height but smaller in diameter of material than the springs 27. The springs 32 are weaker, or, in other words, have less carrying capacity than the springs 27, the springs 32 offering less resistance to the superposed load, and the springs 32 do not bring as great a pressure to bear upon the rails as do the springs 27, so that this arrangement tends to increase the traction of the truck at the large wheel or driving end.

If the trailing end of the truck were unsupported, the preponderance of the major portion of the weight about the large wheel end of the truck (due to location of pivotal center as shown) would have a tendency to lift the trailing end and cause its wheels to jump the track, or pound thereon, and in order to avoid this it has been the custom in structures preceding the present one to interpose a rub plate between the car body and the upper chord of the truck, this being done for the purpose of keeping the trailing end, as it is called, down on the track, preventing the wheels from climbing. In such prior practice the car supporting springs at the trailing end have been located about the axle boxes, so that the pressure brought upon this end to the wheel and thence to the rail was through the springs, thence directly on the axle boxes to the wheel and to the rail. In the present case I have found it a great advantage to bring this weight upon the trailing wheels through the instrumentality of the lever comprising the extensions 9$^b$ and cross bar 12 of the axle box frame, which will increase the pressure of the trailing wheels on the rails and enable me to use one set of comparatively light springs. The spring post and upper chord are braced together at this end by the brace 33 made continuous and of strap iron (preferably) which extends inwardly and diagonally upward, following approximately the contour of the upper chord at this end, as seen in Fig. 2, its upper end being bent flat and secured to the diagonal sections 21 of the upper chord.

It is very desirable that the distance between the axle box frame and the upper chord remain approximately the same, especially at those points between which extend the car springs, and for that purpose I have caused the sections 21 to be deflected downward as they approach the cross section 22, so as to preserve a uniform distance between the axle box frame and upper chord at these points, the section 22 being preferably horizontal with the plane of the axles. I, however, do not limit myself to this.

In cases where the springs at the trailing end of the truck are located adjacent to the axle boxes at that end, the pressure brought to bear on the small wheels to counterbalance the lifting tendency of the truck, which is accomplished by the lever action of the extended axle box frame, as before set forth, may be accomplished by means of a weight located upon a suitable part of the truck, either upon the upper chord, or the axle box frame, and without the wheel base. I, however, prefer to locate this weight upon the end section 12 of the axle box frame or upon some other member suitably secured to the axle box frame and disposed without the wheel base. For the purpose of obtaining this leverage I consider the weight as an equivalent to the spring pressure, and this weight may be constructed and secured to the end section 12 of the axle box frame, as shown in Figs. 5 and 6. There the weight 34 of any desired form may be a lump of cast iron or other desired material formed with downwardly projecting lips 35 which leave a channel between them, into which the end section 12 fits, the lips embracing said end section to which they may be suitably secured, as by bolts 36.

I prefer to have the weight extending upwardly above the axle box frame and between it and the car body or upper chord, for if it depended below the axle box frame it would be liable to strike the track or some other object, and such weight should be of a size that will not interfere with the movement of the car body or upper chord on its supporting springs. If the weight is located upon the upper chord or a portion of the car body, the length of the lever and its effectiveness would be regulated by the distance between the car springs and the weight, in which case the leverage would be obtained through that portion of the car body or the upper chord, thence to the car springs adjacent to the axle boxes, through the axle boxes, axle and wheel to the rail; whereas in the structure illustrated herein it is through the end springs, thence to the extension of the axle box frame, the axle boxes, axle, wheel and rail. I, however, prefer the method shown herein, as a more convenient, and in some cases a more effective structure is obtained.

The cushions 16 between the saddles 8 and the axle boxes 3 are very advantageous in this regard, as they tend to deaden and soften the movement between the axle boxes and the axle box frame, and I prefer their use to supporting the axle box frame upon the axle boxes, metal to metal. However, it is not intended that these cushions should have an amplitude of movement equal to that of the car supporting springs at either end of the truck, but only a movement sufficient for the purpose of elastically supporting the axle box frame upon the axle boxes at this point.

Instead of the axle box frame being located outside of the wheels and supported outside the axle boxes, it can, so far as the question of leverage is concerned, be general to the axles within the wheels, and neither need such extension of the axle box frame be made a part of such frame, as illustrated herein, as a special support, either for the weight or the end springs, can be supported either upon the axle boxes or upon the axle within or outside of the wheels, entirely independent of the axle box frame as it is generally constituted.

The truck herein illustrated is designed for the purpose of carrying a motor, and a form of support for the free end of the motor upon the side bars of the axle box frame, is shown but not claimed herein.

The brake mechanism shown herein (which forms the subject matter of Patent No. 503,121, before referred to) is constructed with the special object in view of leaving the interior space of the truck as clear and unobstructed as possible, and also to provide a brake mechanism wherein the line of draft or pull given to the brake mechanism mounted on the truck by the rod connecting such brake mechanism with the source of power, will remain unchanged by the movement or radiation of the truck, and further to provide a simple and effective system.

The connecting rod 46 leads either from the car platform where it is operated by a windlass or lever in the usual way, or from some proper part of brake mechanism of a truck located under the same car body, or it can be arranged in any way so as to connect it with the source of power. The rod is enlarged and bifurcated as at 47, and has extending through such bifurcation a spindle 48 carrying a roller 49. Located without the wheel base of the truck, and without the truck structure, is a transversely extending segmental equalizing bar 50, having pivotally secured at its ends by means of the pin 51 two longitudinally extending parallel connecting rods 52. It will be noticed that the equalizing bar 50 and connecting rods 52 are so disposed, so as to leave the truck between the wheels and axles practically clear, the rod 46 being united to the truck brake mechanism in such a way that it can move in relation thereto without the truck structure, so that space for such movement is had where it will not interfere with the truck nor its movement. The inner ends of the connecting rods 52 are bent outwardly, as shown at 53 (see Fig. 2), the extreme ends of which are bifurcated as at 54. In this case the brake shoes are applied to the large wheels only, and to support the shoes in proper relation thereto the journal block 55 which has an inwardly extending arm 56 is provided, the bolts 57 securing said journal blocks to the side bars 9 of the axle box frame, and which are located adjacent to the tread of the wheels. Journaled upon the arm 56, and secured thereto by the nut 58 or in any other desired way, is a rocking lever 59, the upper arm of which enters the bifurcations in the ends of the rods 52, and is pivotally secured thereto by the pin 60, the lower arm of said rocking lever being pivotally secured to the lug 61 on the brake shoe 62 by means of the pin 63, the lever 59 thereby supporting the shoe adjacent to the tread of the wheel. A spring 64 secured at one end to the lever 59 bears against the lower portion of the brake shoe and prevents it falling too far away from the tread of the wheel, and keeps it in position for having its entire face presented to the tread of the wheel simultaneously.

It is desirable that means be provided for lengthening or shortening the connecting rods 52, and for this purpose I have made them in two parts, their adjacent ends being screw threaded and united together by the sleeved nut or turn-buckle 65, so that said rods may be lengthened or shortened at will.

For supporting the equalizing bar 50 and the connecting rods 52 I use the hangers 66 which are formed of strap iron bent double to form two parallel bars, and downward, as at 67, and through the sides of the bend 67 extends a pin 68 upon which rests the rods 52, the ends of the hangers being secured to the diagonal sections 21 of the upper chord through the twists 69 on the ends thereof by the bolts 70. The bend 67 of the hanger 66, besides forming a support for the rods 52 forms an abutment for the spiral springs 71 which surround said rods and tend to retract the shoes from the tread of the wheel after they have been applied thereto. A washer 72 abuts against the bend 67, against which washer the spring bears, its other end bearing against the nuts 73 on the rods 52.

I do not limit myself to the method of supporting the rods 52 herein shown, nor the location of the springs or the character thereof for retracting the shoes from the tread of the wheel, as both may be otherwise constructed and disposed, but I prefer that shown herein.

It will be seen from the foregoing that the line of pull or draft can remain constant while the brake mechanism itself can change with the radiation of the truck without pulling unevenly on the connecting rods, the springs 71 tending in a measure to preserve the evenness of the application of the shoes to the wheel.

It is apparent that some portions of the present structure can be used in trucks differing in structure from this; and the use of the brake mechanism herein shown and described is not limited to this class of structure alone, but is one which is especially adapted for it; and that many changes and modifications may be made in the present invention without departing from the spirit thereof.

What I claim is—

1. The combination in a truck having wheels of varying diameter, a frame deriving its support from the axle boxes of the truck, side bearings spring supported upon said frame adjacent to and outside of the large wheels, a bearing and a resilient support for the bearing upon said frame located within the wheel gage in line with the truck center, and adjacent the small wheels of the truck, substantially as described.

2. The combination, in a truck having large or driving wheels at one end and smaller or trailing wheels at the opposing end, of a frame for maintaining the parallelism of the axles supported upon the axle boxes, segmental side bearings resiliently supported upon said frame outside of the larger wheels, the course of the segments being struck from a point within the axle of the larger wheels, an end bearing, and a resilient support for the bearing upon said frame, said support and rub plate being located in a line with the longitudinal center of the truck adjacent the small wheels, substantially as described.

3. A car truck having large and small wheels, an axle box frame supported on the axle boxes, in combination with the segmental side bearings spring supported on the axle box frame outside of and adjacent to the large wheels, and an end bearing having a rotatable element adapted to make a rolling contact with a car body, and a spring support for the bearing on said frame directly below the bearing within the wheel gage and adjacent the small wheels, substantially as described.

4. In a car truck, the combination of an axle box frame supported upon the axle boxes and encompassing all the wheels of the truck, an upper chord having a contracted portion at one end, springs for supporting the upper chord about the axle boxes at one end of the truck, and additional springs for supporting the contracted end of the upper chord upon the axle box frame, substantially as described.

5. In a car truck, the combination with an axle box frame encompassing the wheels and supported upon the axle boxes, an upper chord having a contracted portion at one end thereof, springs for supporting the upper chord about the axle boxes at one end of the truck, and springs of a lesser carrying capacity supporting the contracted portion of the upper chord upon the axle box frame, substantially as described.

6. The combination of a car and truck, the truck having wheels of varying diameter, an axle box frame supported upon the axle boxes and encompassing the wheels of the truck, an upper chord having a contracted portion at one end spring supported about the axle boxes adjacent the larger wheels, additional springs for supporting the contracted portion of the upper chord, said last mentioned springs having a support upon the axle box frame entirely removed from the axle boxes of the smaller wheels, truck bearings oppositely located over the springs adjacent to the large wheels, a bearing located over the additional springs, and means for engaging said bearings with the car body, substantially as described.

7. In a truck, the combination with a substantially rectangular axle box frame, an upper chord encompassing the wheels at one end and lying within the wheels at the other, and springs between the upper chord and axle box frame, located adjacent to the axle boxes at one end of the truck, and between an extension of the axle box frame and the upper chord at the opposite end of the truck, substantially as described.

8. In a car truck, the combination with an axle box frame disposed outside of the wheels at all its points of suspension, an upper chord smaller in diameter at one end than the truck gage, and springs for supporting the upper chord adjacent to the axle boxes at one end of the truck, and additional springs extending between the axle box frame and the upper chord outside of the wheel base of the truck, substantially as described.

9. In a car truck, the combination of an axle box frame on the axle boxes, an upper chord, springs between the said chord and frame and adjacent to the axle boxes at one end of the truck, an additional car spring supported on a transverse member of the truck at the other end, substantially as described.

10. A truck having large and small wheels, an axle box frame extending outside of the wheel base and about the small wheels, an upper chord, and springs for supporting the upper chord of a car body on said frame, some of which are adapted to support the car body on the small wheels from a point without the wheel base, substantially as described.

11. A pivotal truck having large and small wheels, car springs adjacent to the axle boxes of the large wheels, additional springs outside of the wheel base at the small wheel end, a support for said springs on the truck, and devices for pivotally uniting the car body to the truck about the large wheels, substantially as described.

12. A truck adapted to preponderate the major part of the weight of a superposed car upon the wheels at one end, and a minor part upon the wheels at the other, and devices for counterbalancing such inequality in distribution of weight located without the wheel base of the truck at one end thereof, said devices operating initially entirely outside of the wheel base to oppose the weight at the opposite end of the truck, substantially as described.

13. A truck having large and small wheels, and adapted to distribute the major part of the weight of a superposed car body upon the large wheels, and a minor part upon the small wheels, such minor part being transmitted to the small wheels through the instrumentality of a lever of the first order, said lever having its power end directly below the weight, fulcrumed on the axles of the small wheels, and opposed by the weight at the large wheel end, substantially as described.

14. A truck adapted to place the major part of the weight of a superposed car upon the wheels at one end, such wheels having the motive power for propelling the truck applied thereto, the minor part of the superposed weight being taken by the small wheels, and devices comprising a resilient element or elements for counterbalancing such inequality of distribution of weight located outside of the wheel base of the truck at one end thereof, said resilient element being entirely outside of the wheel base, substantially as described.

15. In a truck for railway cars, an axle having a pair of driving wheels thereon, and a pair of guide wheels which are of less diameter than the driving wheels, and an axle box frame supported by said two pairs of wheels, springs supported on the side bars of the axle box frame near the axle boxes of the driving wheels only, an upper chord supported about the axle boxes at the large wheel end by said so located springs, and by additional springs outside of the guide wheels, and devices for pivotally mounting a car body on said upper chord directly over the axles of said driving wheels, and additional springs, substantially as described.

16. An axle box frame comprising side bars and cross bars uniting the side bars, the side bars having saddles or bearing surfaces for the axle boxes extending above and below the main web of the side bars, the side and cross bars and saddles being formed into one piece of metal homogeneous throughout, substantially as described.

17. The combination with the wheels and axles, of the axle box frame supported on all points without the wheels, having a cross bar disposed without the wheel base at one end, an upper chord spring supported about the axle boxes at the opposite end, and a spring between the said cross bar and upper chord, substantially as described.

18. The combination with the wheels and axles, of the axle box frame supported on all points without the wheels, having a cross bar disposed without the wheel base at one end, an upper chord spring supported about the axle boxes at the opposing end, a spring between the said chord and bar, and a rub plate on the chord and above the spring, substantially as described.

19. In a car truck, the axle box frame extension disposed outside of the wheel base at one end of the truck and adapted to receive weight from a superposed car, axle boxes, and an elastic support for said extension upon the axle boxes, substantially as described.

20. In a truck, the combination with the axle box frame having a cross bar extending between the side bars thereof, a spring supported upper chord smaller in diameter where it approaches the cross bar, and a spring between the cross bar and the reduced end of the upper chord, substantially as described.

21. An axle box frame made into a single homogeneous piece of metal, comprising longitudinal and transverse members, axle box yokes or pedestals in the longitudinal members, the transverse members, extending between the extreme ends of the longitudinal members, thereby making a continuous unbroken frame, substantially as described.

22. An axle box frame having side and cross bars, the side bars being deflected downward at one end, the cross bars uniting the side members at the end thereof, and axle box yokes in the side bars having bearing surfaces of varying height both in relation to each other and to the side bars, the side and cross bars and the yokes being made or formed into one single homogeneous piece of metal continuous throughout, substantially as described.

23. In a truck, the axle box frame having a bar extending transversely of the truck from a point beyond the axle at one end of the truck, and a weight secured to said bar, whereby additional tractive power is given to the wheels at that end, substantially as described.

24. In a truck, the axle box frame having a transversely extending cross bar outside of one of the truck axles, and a weight detachably secured to said cross bar, substantially as described.

25. In a truck, the axle box frame having a transversely extending cross bar disposed without the wheel base of the truck, and a weight secured to said cross bar, substantially as described.

26. The upper chord having a substantially rectangular contour at one end and a pyramidal contour at the other, combined with the truck, and supporting springs, oppositely located about the axle boxes at one end of the truck and between the opposing sides of the truck at the other end, substantially as described.

27. In a car truck, the combination of the axle box frame, the upper chord, car springs for supporting the upper chord or car body on the axle box frame located adjacent to the axle boxes at one end of the truck, and additional springs extending between a transverse member of the axle box frame and the upper chord or car body, said additional springs being of a lesser carrying capacity than the axle box springs, substantially as described.

28. The upper chord of substantially rectangular form at one end and narrowed at the other end, combined with a system of springs for supporting the same, the rectangular end of the upper chord being supported by oppositely located springs, the narrowed end being supported by springs located between the opposing sides of the truck, substantially as described.

Signed at the city of Philadelphia, county of Philadelphia, State of Pennsylvania, this 19th day of October, 1892.

JOHN A. BRILL.

Witnesses:
HENRY C. ESLING,
BLANCHE BRILL.